United States Patent
Fei et al.

(10) Patent No.: US 11,630,953 B2
(45) Date of Patent: Apr. 18, 2023

(54) SYSTEMS AND METHODS FOR END-TO-END DEEP REINFORCEMENT LEARNING BASED COREFERENCE RESOLUTION

(71) Applicants: Baidu USA, LLC, Sunnyvale, CA (US); Baidu.com Times Technology (Beijing) Co., Ltd., Beijing (CN)

(72) Inventors: Hongliang Fei, Sunnyvale, CA (US); Xu Li, Beijing (CN); Dingcheng Li, Sammamish, WA (US); Ping Li, Bellevue, WA (US)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 378 days.

(21) Appl. No.: 16/960,014

(22) PCT Filed: Jul. 25, 2019

(86) PCT No.: PCT/CN2019/097703
§ 371 (c)(1),
(2) Date: Jul. 2, 2020

(87) PCT Pub. No.: WO2021/012263
PCT Pub. Date: Jan. 28, 2021

(65) Prior Publication Data
US 2021/0240929 A1 Aug. 5, 2021

(51) Int. Cl.
*G06F 40/30* (2020.01)
*G06N 20/00* (2019.01)
(Continued)

(52) U.S. Cl.
CPC ............ *G06F 40/279* (2020.01); *G06F 40/30* (2020.01); *G06N 3/044* (2023.01); *G06N 3/047* (2023.01); *G06N 3/082* (2013.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS 9,514,098 B1 * 12/2016 Subramanya ......... G06F 40/284
10,679,622 B2 * 6/2020 Bharadwaj ............ G06F 40/216
(Continued)

FOREIGN PATENT DOCUMENTS

| CN | 105302794 A | 2/2016 |
|----|-------------|--------|
| CN | 109446517 A | 3/2019 |

OTHER PUBLICATIONS

Haghighi et al.,"Coreference Resolution in a Modular, Entity-Centered Model," In Proceedings of Human Language Technologies: Conference of the North American Chapter of the Association of Computational Linguistics (NAACL), pp. 385-393, 2010. (9 pgs).

(Continued)

*Primary Examiner* — Lamont M Spooner
(74) *Attorney, Agent, or Firm* — North Weber & Baugh LLP (57) ABSTRACT

Described herein are embodiments for end-to-end reinforcement learning based coreference resolution models to directly optimize coreference evaluation metrics. Embodiments of a reinforced policy gradient model are disclosed to incorporate reward associated with a sequence of coreference linking actions. Furthermore, maximum entropy regularization may be used for adequate exploration to prevent a model embodiment from prematurely converging to a bad local optimum. Experiments on datasets compared with state-of-the-art methods verified the effectiveness of embodiments.

21 Claims, 8 Drawing Sheets

(51) Int. Cl.
  *G06F 40/279* (2020.01)
  *G06N 3/082* (2023.01)
  *G06N 3/044* (2023.01)
  *G06N 3/047* (2023.01)

(56) References Cited

U.S. PATENT DOCUMENTS

| | | | | |
|---|---|---|---|---|
| 10,726,206 | B2* | 7/2020 | Sigal | G06N 3/0454 |
| 10,885,452 | B1* | 1/2021 | Garg | G06N 5/046 |
| 11,030,414 | B2* | 6/2021 | Peters | G06F 40/295 |
| 11,442,992 | B1* | 9/2022 | Moon | G06N 20/00 |
| 2005/0210008 | A1* | 9/2005 | Tran | G06F 16/951 |
| 2011/0295594 | A1 | 12/2011 | Cai et al. | |
| 2017/0109335 | A1* | 4/2017 | Lee | G06F 40/169 |
| 2017/0351749 | A1* | 12/2017 | Quirk | G06F 16/345 |
| 2018/0233141 | A1* | 8/2018 | Solomon | G01S 5/18 |
| 2018/0260680 | A1* | 9/2018 | Finkelstein | G06N 5/04 |
| 2018/0293221 | A1* | 10/2018 | Finkelstein | G06N 20/00 |
| 2018/0330231 | A1* | 11/2018 | Gu | G06N 5/041 |
| 2018/0336183 | A1* | 11/2018 | Lee | G06N 3/08 |
| 2019/0340202 | A1* | 11/2019 | Kandur Raja | G06F 16/94 |
| 2020/0279001 | A1* | 9/2020 | Prabhugaonkar | G06F 16/24522 |

OTHER PUBLICATIONS

Hajishirzi et al.,"Joint coreference resolution and named-entity linking with multi-pass sieves," In Proceedings of the 2013 Conference on Empirical Methods in Natural Language Processing (EMNLP), pp. 289-299, 2013. (11 pgs).

Lee et al.,"End-to-end Neural Coreference Resolution," In Proceedings of the 2017 Conference on Empirical Methods in Natural Language Processing (EMNLP), pp. 188-197, 2017. (10 pgs).

Lee et al.,"Higher-order Coreference Resolution with Coarse-to-fine Inference," In Proceedings of the 2018 Conference of the North American Chapter of the Association for Computational Linguistics: Human Language Technologies (NAACL-HLT), pp. 687-692, 2018. (6 pgs).

Luan et al.,"Multi-Task Identification of Entities, Relations, and Coreferencefor Scientific Knowledge Graph Construction," In Proceedings of the 2018 Conference on Empirical Methods in Natural Language Processing (EMNLP), pp. 3219-3232, 2018. (14pgs).

Mnih et al., "Asynchronous methods for deep reinforcement learning," arXiv preprint arXiv:1602.01783, 2016. (28 pgs).

Peters et al., "Deep contextualized word representations" arXiv preprint arXiv:1802.05365, 2018. (15 pgs).

Pradhan et al., "CoNLL-2011 Shared Task:Modeling Unrestricted Coreference in OntoNotes," In Proceedings of the Fifteenth Conference on Computational Natural Language Learning: Shared Task, pp. 1-27, 2011. (27pgs).

Recasens et al., "BLANC: Implementing the Rand index for coreference evaluation," Natural Language Engineering, 17(4):485-510, 2011. (6 pgs).

Weston et al.,"Towards AI-Complete Question Answering: A Set of Prerequisite Toy Tasks," arXiv preprint arXiv:1502.05698, 2015. (10pgs).

Wiseman et al., "Learning Global Features for Coreference Resolution," In Proceedings of the 2016 Conference of the North American Chapter of the Association for Computational Linguistics: Human Language Technologies (NAACL-HLT), pp. 994-1004, 2016. (11 pgs).

Yin et al., "Deep Reinforcement Learning for Chinese Zero pronoun Resolution," In Proceedings of the 56th Annual Meeting of the Association for Computational Linguistics (ACL), pp. 569-578, 2018. (10 pgs).

Cai et al., "Evaluation metrics for end-to-end coreference resolution systems," In Proceedings the 11th Annual Meeting of the Special Interest Group on Discourse and Dialogue (SIGDIAL), pp. 28-36, 2010. (9 pgs).

Clark et al., "Deep Reinforcement Learning for Mention-Ranking Coreference Models," In Proceedings of the 2016 Conference on Empirical Methods in Natural Language Processing (EMNLP), pp. 2256-2262, 2016. (7pgs).

Clark et al., "Improving Coreference Resolution by Learning Entity-Level DistributedRepresentations," In Proceedings of the 54th Annual Meeting of the Association for Computational Linguistics (ACL), pp. 643-653, 2016. (11 pgs).

Dai et al., "Coreference Aware Representation Learning forNeural Named Entity Recognition," In Proceedings of the International Joint Conference on Artificial Intelligence (IJCAI), 2019. (8 pgs).

Eysenbach et al., "Diversity Is AllYou Need:Learning Skills Without Areward Function," arXiv preprint arXiv:arXiv:1802.06070, 2018. (15 pgs).

Grishman et al., "Design of the MUC-6 evaluation," In Proceedings of the 6th conference on Message understanding (MUC), pp. 1-11, 1995. (11 pgs).

Zhang et al., "Neural Coreference Resolution with Deep Biaffine Attentionby Joint Mention Detection and Mention Clustering," In Proceedings of the 56th Annual Meeting of the Association for Computational Linguistics (ACL), pp. 102-107, 2018. (6pgs).

International Search Report dated Apr. 29, 2020, in International Patent Application No. PCT/CN2019/097703, filed Jul. 25, 2019. (4 pgs).

Written Opinion of the International Searching Authority dated Apr. 29, 2020, in International Patent Application No. PCT/CN2019/097703, filed Jul. 25, 2019. (4 pgs).

Lee et al, "End-to-end Neural Coreference Resolution," Proceedings of the 2017 Conference on Empirical Methods in Natural Language Processing (EMNLP), Dec. 31, 2017, pp. 188-197. (10 pgs).

Lee et al,"Higher-order Coreference Resolution with Coarse-to-fine Inference," Proceedings of the 2018 Conference of the North American Chapter of the Association for Computational Linguistics: Human Language Technologies (NAACL-HLT) Dec. 31, 2018, pp. 687-692. (6 pgs).

Wu et al.,"A Deep Learning Framework for Coreference Resolution Based on Convolutional Neural Network," 2017 IEEE 11th International Conference on Semantic Computing Dec. 31, 2017, pp. 61-64. (4pgs).

* cited by examiner

SYSTEMS AND METHODS FOR END-TO-END DEEP REINFORCEMENT LEARNING BASED COREFERENCE RESOLUTION

CROSS-REFERENCE TO RELATED APPLICATIONS

This patent application is filed pursuant to 35 USC § 371 as a US National Phase Application of International Patent Application No. PCT/CN2019/097703, filed on 25 Jul. 2019, entitled "SYSTEMS AND METHODS FOR END-TO-END DEEP REINFORCEMENT LEARNING BASED COREFERENCE RESOLUTION," listing Hongliang Fei, Xu Li, Dingcheng Li, and Ping Li as inventors, which patent document is incorporated by reference herein in its entirety and for all purposes.

TECHNICAL FIELD

The present disclosure relates generally to systems and methods for natural language processing. More particularly, the present disclosure relates to systems and methods for coreference resolution in natural language processing.

BACKGROUND

Coreference resolution is one of the most fundamental tasks in natural language processing (NLP), which has a significant impact on many downstream applications including information extraction, question answering, and entity linking. Given an input text, coreference resolution aims to identify and group all the mentions that refer to the same entity.

In recent years, deep neural network models for coreference resolution have been prevalent. These models, however, either assumed mentions were given and only developed a coreference linking model or built a pipeline system to detect mention first then resolved coreferences. Either case depended on hand-crafted features and syntactic parsers were used, which may not generalize well or may even propagate errors.

Accordingly, what is needed are systems and methods for systems and methods for coreference resolution in natural language processing for improved performance.

SUMMARY

In a first aspect, a computer-implement method for training a coreference resolution model is provided. The method includes: [a] inputting a document comprising a set of text into a policy network to identify mentions in the document; [b] given a current identified mention in the document, using the policy network to obtain a probability distribution of a set of actions in which the set of actions comprise linking the current identified mention with a prior identified mention or not linking the current identified mention to any prior identified mention; [c] selecting an action from the set of actions using the probability distribution of actions; [d] based upon the selected action, updating a coreference graph for the document, in which the coreference graph comprises mentions as nodes and links representing coreference connections between mentions; [e] responsive to the document having another mention, selecting it as the current identified mention and returning to step [b]; [f] responsive to the document not having another mention, outputting the coreference graph for the document; [g] using the outputted coreference graph and ground truth coreference information for the document, computing a reward based upon one or more metrics; [h] using a trajectory of actions selected and the reward to compute a gradient; and [i] updating the policy network using the gradient.

In a second aspect, a computer-implement method for coreference resolution using a coreference resolution model is provided. The method includes: receiving a document comprising a set of words; generating, using a character and word embeddings encoder, a plurality of embeddings with each embedding as a concatenation of fixed word embeddings and convolutional neural network (CNN) character embeddings; computing and concatenating, using a bidirectional Long short-term memory (LSTM) layer, contextualized representation of each word in the document from two directions; performing iterative operations including: generating, with head-finding attention, span representation from the concatenated contextualized representations for a current mention, obtaining a mention score using a mention feed-forward neural network with a self-attention mechanism based on the generated span representation, obtaining an antecedent score using an antecedent feed-forward neural network with the self-attention mechanism based on the generated span representation, and obtaining a coreference score for the current mention based on at least the generated mention score and the generated antecedent score; computing, using a masked softmax layer, probability distribution over a set of actions in which the set of actions comprise linking the current identified mention with a prior identified mention or not linking the current identified mention to any prior identified mention for the current mention based at least on the coreference score; selecting an action from the set of actions using the probability distribution of actions; and based upon the selected action, updating a coreference graph for the document, in which the coreference graph comprises mentions as nodes and links representing coreference connections between mentions.

In a third aspect, a non-transitory computer-readable medium or media including one or more sequences of instructions is provided. The instructions, when executed by one or more processors, causes the one or more processors to perform the method of the first aspect.

In a fourth aspect, a system for training a coreference resolution model is provided. The system includes at least one processor, and a memory storing instructions, where the instructions, when executed by the at least one processor, cause the at least one processor to perform the method of the first aspect.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION

In the following description, for purposes of explanation, specific details are set forth in order to provide an understanding of the present disclosure. It will be apparent, however, to one skilled in the art that embodiments may be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the present disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

A "document" shall be understood to mean a set of text. A "mention" shall be understood as a text span meaning the same real world entity, property, situation, distinct concept, whether tangible or intangible, or an anaphora (e.g. pronoun, nominals, noun-phrases) in the document.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Coreference resolution is one of the most fundamental tasks in natural language processing (NLP), which has a significant impact on many downstream applications including information extraction, question answering, and entity linking. Given an input text, coreference resolution aims to identify and group all the mentions that refer to the same entity.

In recent years, deep neural network models for coreference resolution have been prevalent. These models, however, either assumed mentions were given and only developed a coreference linking model or built a pipeline system to detect mention first then resolved coreferences. Either case depended on hand-crafted features and syntactic parsers were used, which may not generalize well or may even propagate errors.

To avoid the cascading errors of pipeline systems, end-to-end approaches have been developed. Such approaches directly consider all text spans, jointly identify entity mentions and cluster them. The core of those end-to-end models are vector embeddings to represent text spans in the document and scoring functions to compute the mention scores for text spans and antecedent scores for pairs of spans. Depending on how the span embeddings are computed, the end-to-end coreference models may be further divided into first order methods or higher order methods.

Although recent end-to-end neural coreference models have advanced the state-of-the-art performance for coreference resolution, they are still trained with heuristic loss functions and make a sequence of local decisions for each pair of mentions. However, as studied by Clark and Manning (Deep reinforcement learning for mention-ranking coreference models. In Proceedings of the 2016 Conference on Empirical Methods in Natural Language Processing (EMNLP), pages 2256-2262, Austin, Tex.) and Yin et al. (Deep reinforcement learning for Chinese zero pronoun resolution. In Proceedings of the 56th Annual Meeting of the Association for Computational Linguistics (ACL), 2018, pages 569-578, Melbourne, Australia), most coreference resolution evaluation measures are not accessible over local decisions, but can only be known until all other decisions have been made. Therefore, the next key research question is how to integrate and directly optimize coreference evaluation metrics in an end-to-end manner.

Figure 1:
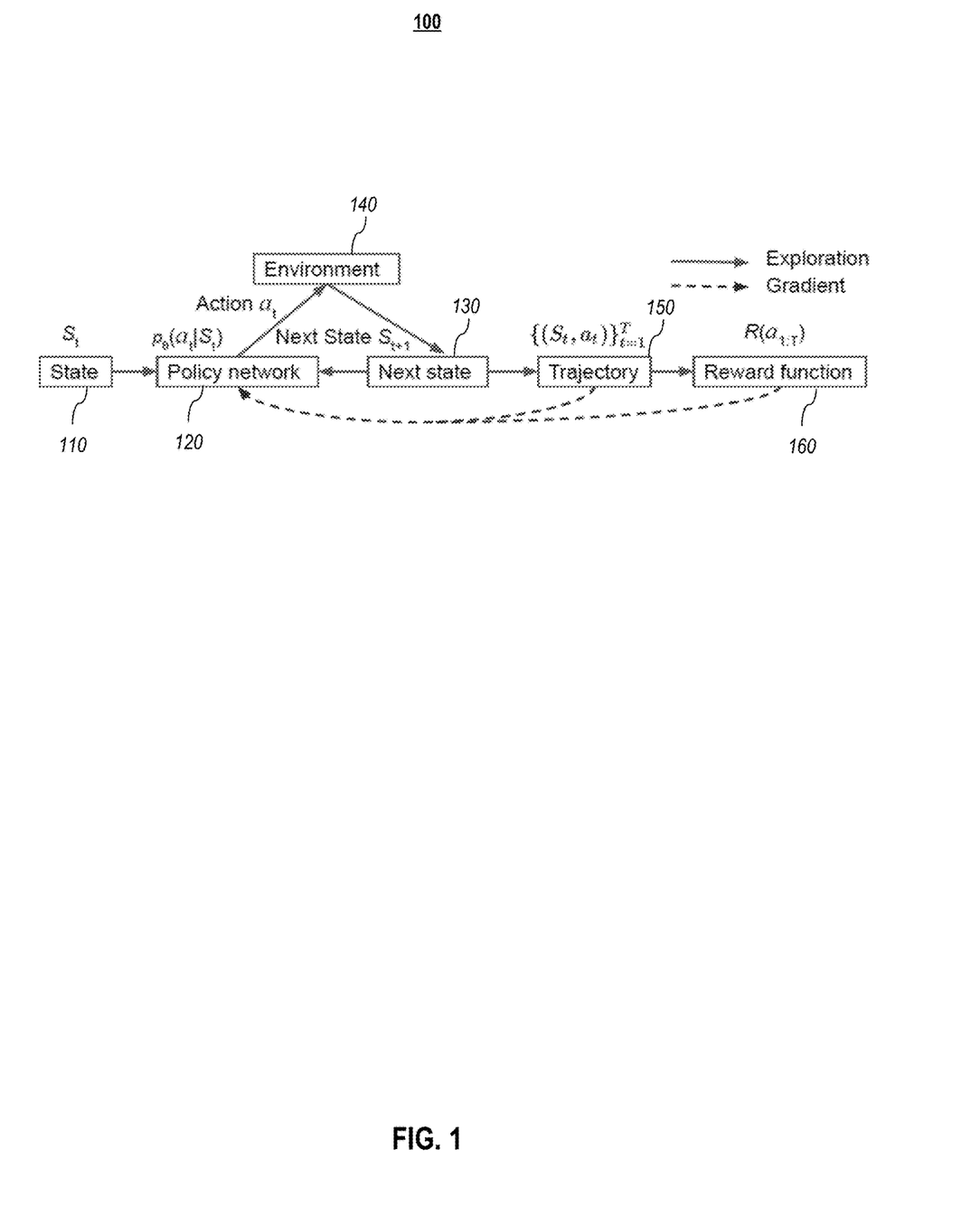
FIG. 1 depicts a framework of a coreference resolution model for one trajectory, according to embodiments of the present disclosure.
Figure 2:
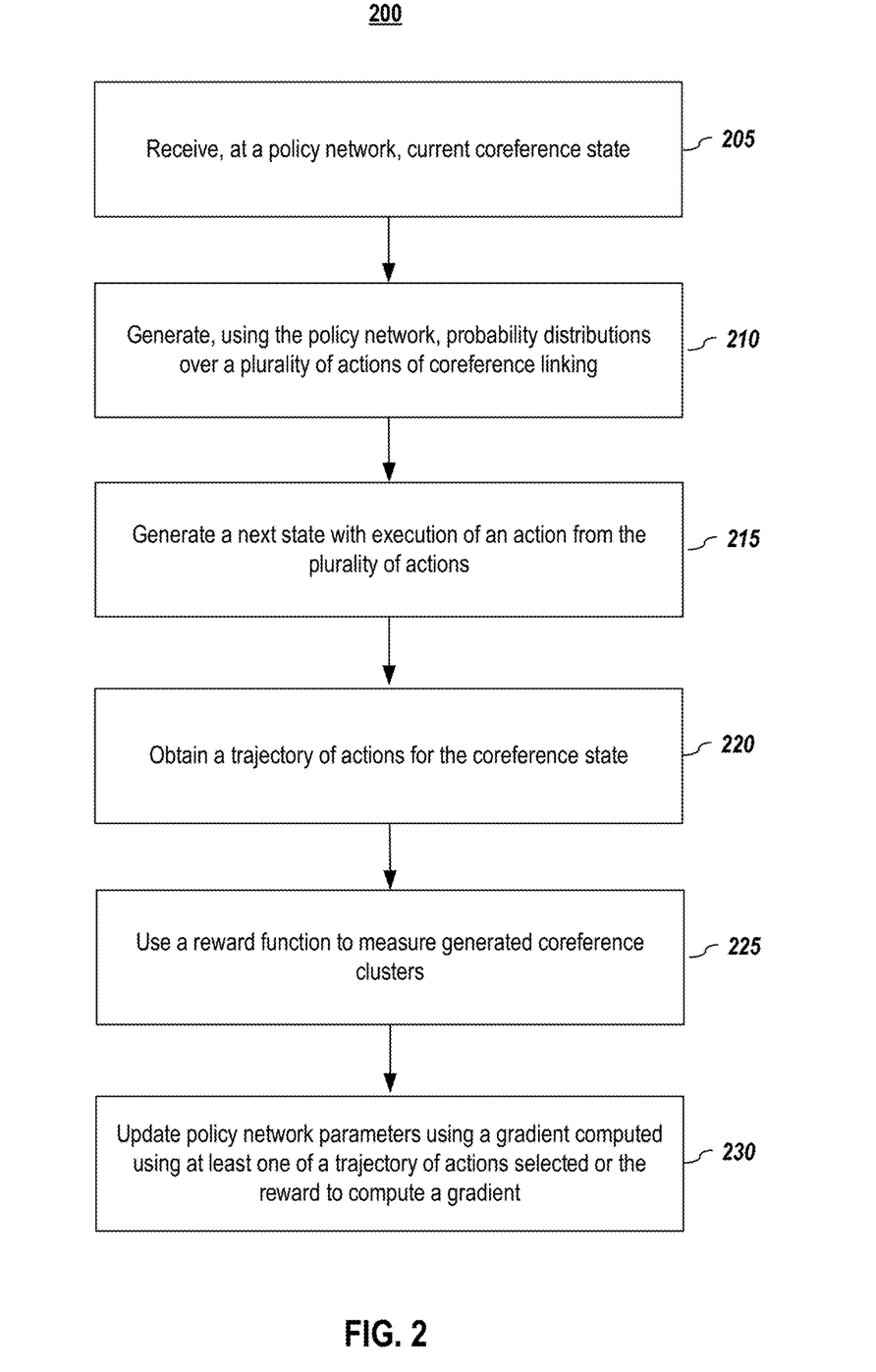
FIG. 2 depicts a method for training the coreference resolution model, according to embodiments of the present disclosure.

FIG. 1 shows a goal-directed end-to-end deep reinforcement learning framework to resolve coreference, according to embodiments of the present disclosure, and FIG. 2 depicts a process for training the deep reinforcement learning framework, according to embodiments of the present disclosure. The solid line in FIG. 1 indicates the model exploration and the dashed line indicates the gradient update. In one or more embodiments, a policy network 120 receives (205) current coreference state $S_t$ 110 to generate (210) probability distributions $p_\theta(a_t|S_t)$ 120 over a plurality of actions at of coreference linking. The state at time t may be defined as $S_t = \{g_1, \ldots, g_{t-1}, g_t\}$, where $g_i$ is the mention i's representation. The actions may be used to update an environment or a coreference graph 140, which comprises mentions as nodes and links representing coreference connections between mentions. The coreference graph is updated based upon the selected action, for the document, in which the coreference graph comprises mentions as nodes and links representing coreference connections between mentions. A next state $S_{t+1}$ 130 is transited from mention t to mention t+1 after execution of an action at from the plurality of actions. In one or more embodiments, the next state $S_{t+1}$ is generated based on the natural order of the starting positions and then the end positions of mentions regardless of action $a_t$. A trajectory of action 150 is obtained or updated (220) for the coreference state for a predetermined time step T.

In one or more embodiments, the policy network 120 is an end-to-end neural module. The reward function computes a reward given a trajectory of actions based on coreference evaluation metrics. In one or more embodiments, a neural architecture is leveraged as a policy network, which includes learning span representation, scoring potential entity mentions, and generating a probability distribution over all possible coreference linking actions from the current mention to its antecedents. Once a sequence of linking actions are made, a reward function 160 is obtained and used (225) to measure how good the generated coreference clusters are, which is directly related to coreference evaluation metrics. In one or more embodiments, a reward may be computed using the outputted coreference graph and ground truth coreference information for the document based upon one or more metrics. In one or more embodiments, an entropy regularization term is introduced to encourage exploration and prevent the policy from prematurely converging to a bad local optimum. Finally, the regularized policy network parameters are updated (230) using a gradient computed using at least one of a trajectory of actions selected or the reward to compute a gradient.

In one or more experimental settings, embodiments of the disclosed end-to-end reinforced coreference resolution model were evaluated using on one or more datasets. The presented model achieves the new state-of-the-art F1-score of 73.8%, which outperforms some previous best-published result (73.0%) of Lee et al. (Higher-order coreference resolution with coarse-to-fine inference. In *Proceedings of the 2018 Conference of the North American Chapter of the Association for Computational Linguistics: Human Language Technologies* (NAACL-HLT), pages 687-692, New Orleans, La., hereinafter "Lee 2018") with statistical significance.

B. Some Related Works

In this section, some previous related works are discussed to help understand the embodiments of the presented invention.

While it may appear that some embodiments of the presented patent disclosure are somewhat similar to the end-to-end coreference models developed by Lee et al. (End-to-end Neural Coreference Resolution. In *Proceedings of the* 2017 *Conference on Empirical Methods in Natural Language Processing* (*EMNLP*), pages 188-197, Copenhagen, Denmark, hereinafter "Lee 2017") and Lee 2018, there are significant differences. Lee 2017 and Lee 2018 appear to use neural networks to learn mention representations and to calculate mention and antecedent scores without using syntactic parsers. However, their models optimize a heuristic loss based on local decisions rather than the actual coreference evaluation metrics, while reinforcement model embodiments herein directly optimize the evaluation metrics based on the rewards calculated from sequences of actions.

Clark and Manning, and Yin et al. resolve coreferences with reinforcement learning techniques. They appear to view the mention-ranking model as an agent taking a series of actions, where each action links each mention to a candidate antecedent. They also use pretraining for initialization. Nevertheless, their models assume mentions are given while embodiments of the present patent disclosure are end-to-end. Furthermore, in one or more embodiments, entropy regularization is added to encourage more exploration and prevent model from prematurely converging to a suboptimal (or bad) local optimum.

C. Methodology Embodiments

1. Task Definition

Given a document, the task of end-to-end coreference resolution aims to identify a set of mention clusters, each of which refers to the same entity. In one or more embodiments, the task are formulated as a sequence of linking decisions for each span i to the set of its possible antecedents, denoted as $Y(i) = \{\epsilon, 1, \ldots, i-1\}$, a dummy antecedent $\epsilon$ and all preceding spans. In particular, the use of dummy antecedent $\epsilon$ for a span is to handle two possible scenarios: (i) the span is not an entity mention or (ii) the span is an entity mention but it is not coreferent with any previous spans. In one or more embodiments, final coreference clusters may be recovered with a backtracking step on the antecedent predictions. In one or more embodiments, the backtracking step may be implemented as a graph search procedure, either depth or breadth first search.

2. Model Embodiments

Figure 3:
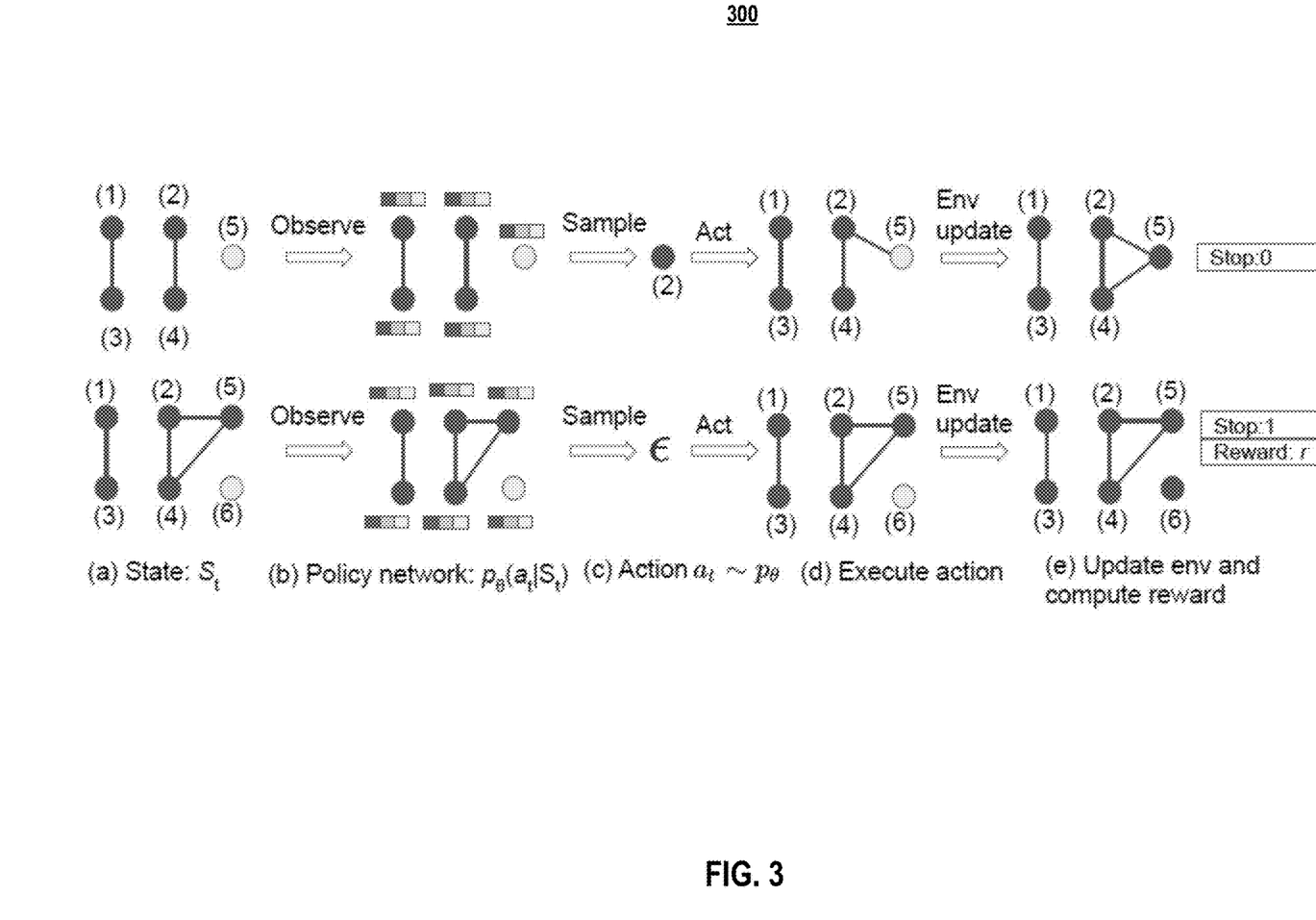
FIG. 3 graphically depicts an exemplary conference graph for demonstration of a reinforced coreference resolution method on a document with 6 mentions, according to embodiments of the present disclosure.

FIG. 3 illustrates an exemplary conference graph for demonstration of the presented iterative coreference resolution model on a document with six mentions. The upper and lower rows correspond to steps for mentions (5) and (6) respectively, in which the policy network selects mention (2) as the antecedent of mention (5) and leaves mention (6) as a singleton mention. The dark and gray nodes represent processed (current) mentions and edges between them indicate current predicted coreferential relations. The gray rectangles around circles are span embeddings and the reward r is calculated at the trajectory end.

In one or more embodiments, given a document, the presented model first identifies top scored mentions, and then conducts a sequence of actions $a_{1:T} = \{a_1, a_2, \ldots, a_T\}$ over them, where T is the number of mentions and each action $a_t$ assigns mention t to a candidate antecedent $y_t$ in $Y_t = \{\epsilon, 1, \ldots, i-1\}$. The state at time t is defined as $S_t = \{g_1, \ldots, g_{t-1}, g_t\}$, where $g_i$ is the mention i's representation.

In one or more embodiments, once the model has finished all the actions, it observes a reward $R(a_{1:T})$. The calculated gradients are then propagated to update model parameters. In one or more embodiments, the average of the three metrics is used: MUC (Grishman and Sundheim, 1995, Design of the MUC-6 evaluation. In *Proceedings of the 6th conference on Message understanding (MUC)*, pages 1-11, Columbia, Md.), B³ (Bagga, A., and Baldwin, B. 1998, Algorithms for scoring coreference chains. In *Proceedings of the LREC* 1998 *Workshop on Linguistic Coreference*, pp. 563-566. Granada, Spain) and CEAF$\phi_4$ (Cai and Strube, 2010. Evaluation metrics for end-to-end coreference resolution systems. In *Proceedings the 11th Annual Meeting of the Special Interest Group on Discourse and Dialogue (SIGDIAL)*, pages 28-36, Tokyo, Japan) as the reward. For CEAF$\phi_4$ metrics, the $\phi_4(*,*)$ computes a normalized similarity for each entity pair using a summed number of mentions in the key and the response. CEAF (Constrained Entity-Alignment F-Measure) precision then distributes that similarity evenly over the response set.

In one or more embodiments, actions are assumed to be independent and the next state $S_{t+1}$ is generated based on the natural order of the starting position and then the end position of mentions regardless of action $a_t$.

Figure 4:
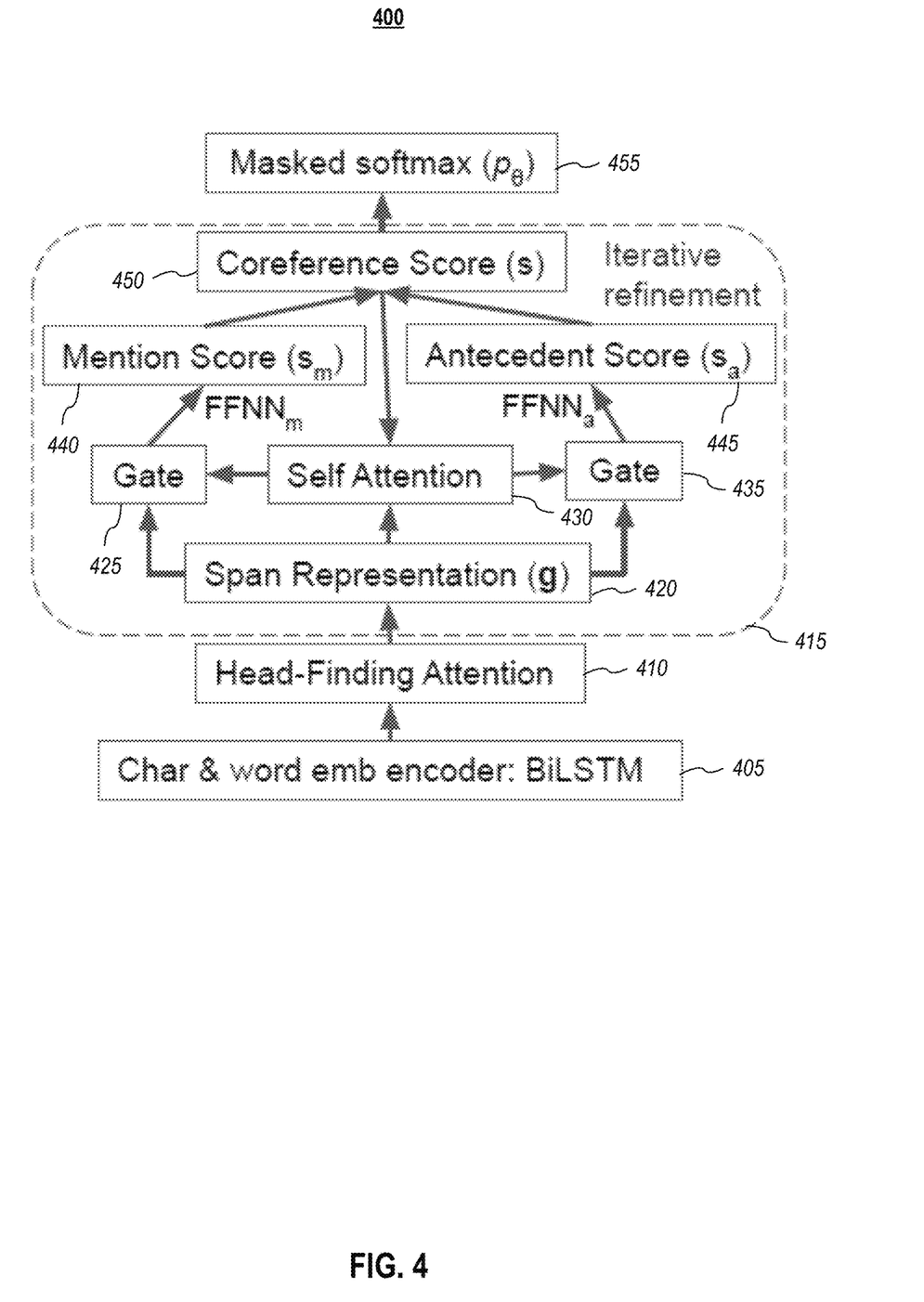
FIG. 4 depicts architecture of a policy network, according to embodiments of the present disclosure.

Policy Network: In one or more embodiments, the state-of-the-art end-to-end neural coreference scoring architecture from Lee 2018 is adopted and a masked softmax layer is further added to compute the probability distribution over actions, as illustrated in FIG. 4. The policy network may comprise a character and word encoder 405, a head-finding attention module 410, a span representation 420, a first gate 425 and a second gate 435, a self-attention module 430, and a masked softmax layer 455. The components in dashed square 415 iteratively refine span representations. In one or more embodiments, the last layer is a masked softmax layer 455 that computes probability distribution only over the candidate antecedents for each mention. In one or more embodiments, the policy network may further comprise a span generation and pruning component, which is omitted in FIG. 4 for simplicity of the figure. Two aspects help provide success: (i) a coarse-to-fine pruning to reduce the search space, and (ii) an iterative procedure to refine the span representation with a self-attention mechanism that averages over the previous round's representations weighted by the normalized coreference scores.

Figure 5:
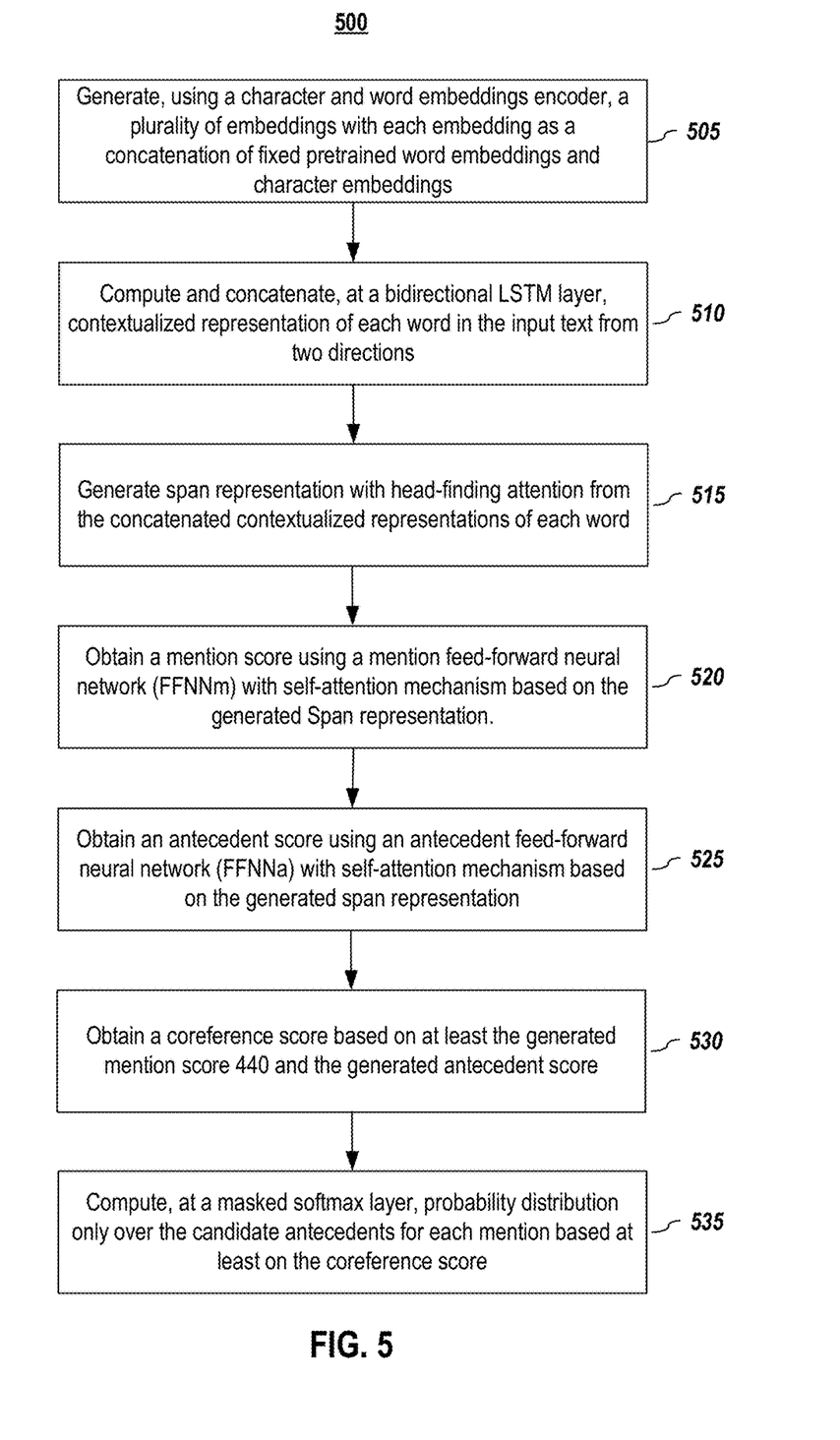
FIG. 5 depicts a method for obtaining a probability distribution over actions using the policy network, according to embodiments of the present disclosure.

A process for obtaining a probability distribution over actions using the policy network 400 is shown in FIG. 5. In one or more embodiments, a plurality of embeddings are generated (505), using a character and word embeddings encoder, with each embedding as a concatenation of fixed pretrained word embeddings and character embeddings. In one or more embodiments, a convolutional neural network (CNN) is applied on the character embeddings with max-pooling. Contextualized representation of each word in the input text from two directions is computed (510) at a bidirectional Long short-term memory (BiLSTM) layer and concatenated. Span representation is generated (515) with head-finding attention from the concatenated contextualized representations of each word. A mention score 440 is obtained (520) using a mention feed-forward neural network (FFNN$_m$) with self-attention mechanism based on the generated span representation. An antecedent score 445 is obtained (525) using an antecedent feed-forward neural network (FFNN$_a$) with self-attention mechanism based on the generated span representation. In one or more embodiments, the self-attention mechanism averages over the previous round's representations weighted by the normalized coreference scores. A coreference score 450 may then be obtained (530) based on at least the generated mention score 440 and the generated antecedent score 445. A masked softmax layer 455 computes (535) probability distribution over the candidate antecedents for each mention based at least on the coreference score.

Additional details of the components in the policy network embodiments are disclosed below:

Character and word embeddings Encoder: In one or more embodiments, the encoder 405 generates a plurality of embeddings with each embedding as a concatenation of fixed pretrained word embeddings and CNN character embeddings. In an alternative embodiment, a BiLSTM may be used instead to learn character embeddings.

BiLSTM layer: A bidirectional LSTM layer is used to compute contextualized representation of each word in the input text from two directions and concatenated.

$$\vec{h}_t = \text{LSTM}^{forward}(\vec{h}_{t-1}, w_t)$$

$$\overleftarrow{h}_t = \text{LSTM}^{backward}(\overleftarrow{h}_{t+1}, w_t)$$

$$h_t = [\vec{h}_t, \overleftarrow{h}_t]$$

Alternatively, the BiLSTM component may be replaced with a Temporal Convolutional Nets (TCNs) (Bai et al, 2017, An Empirical Evaluation of Generic Convolutional and Recurrent Networks for Sequence Modeling, arXiv: 1803.01271), which may also capture temporal dependency but is much faster to compute.

Head-finding attention: The head-finding attention module 410 computes a weighted sum over different words in a span $s_i$. In one or more embodiments, the attended representation of a span may be expressed as:

$$\hat{x}_i = \sum_{t=START(i)}^{END(i)} s_{i,t} * h_t \qquad (1)$$

where:

$$\alpha_t = v_a^T FFNN_\alpha(h_t)$$

$$s_{i,t} = \frac{\exp(\alpha_t)}{\sum_{k=START(i)}^{END(i)} \exp(\alpha_k)}$$

In an alternative embodiment, other popular attention mechanisms may be used, such as cosine attention, inner product attention, among others. In embodiments, this component may be replaced with a max/average pooling procedure.

Figure 6:
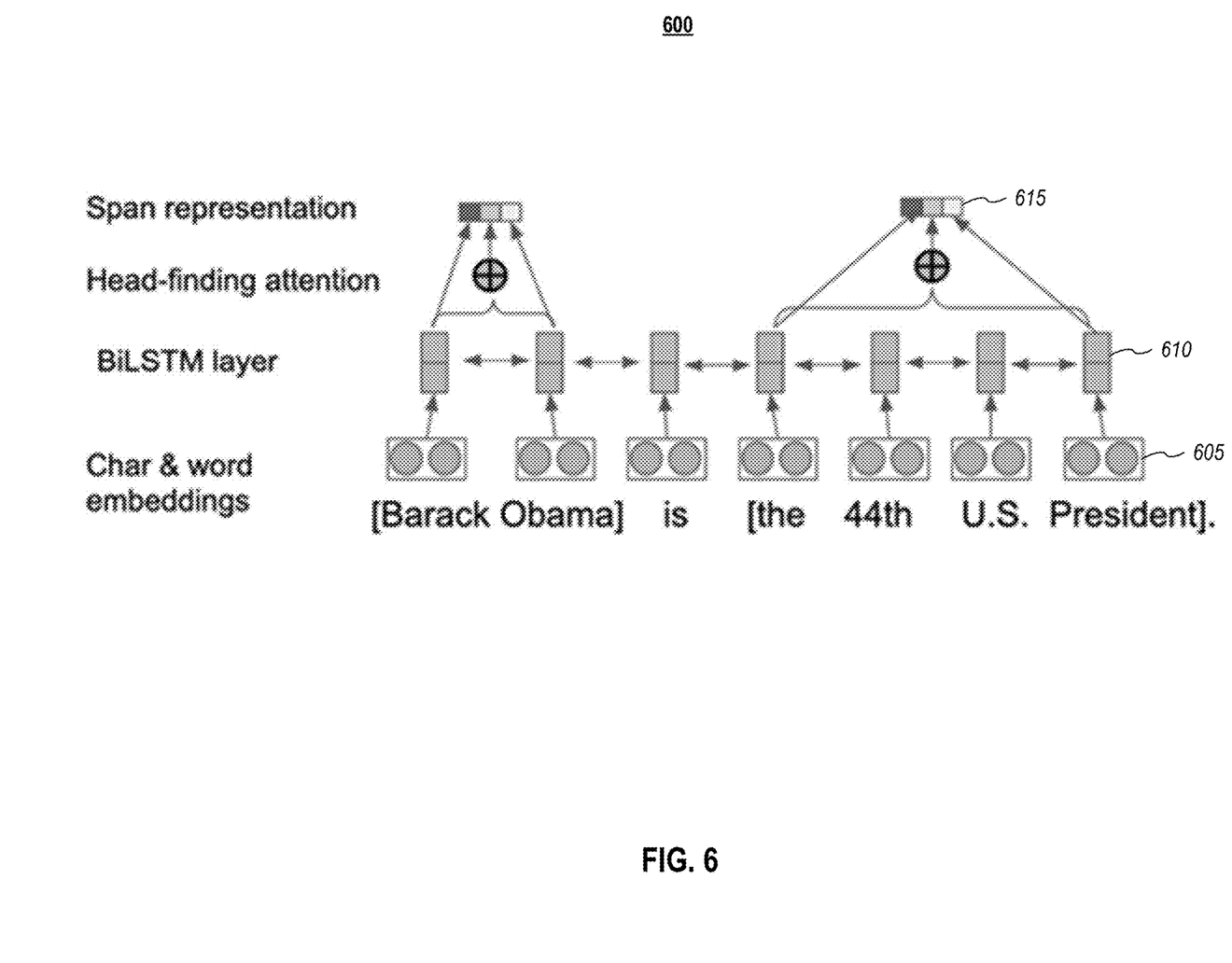
FIG. 6 depicts architecture for initial span representation computation, according to embodiments of the present disclosure.

Span representation: FIG. 6 depicts architecture for computing initial span representation from character & word embeddings 605, according to embodiments of the present patent disclosure. In FIG. 6, only two text spans with high mention scores are shown. The embeddings 605 are fed into a BiLSTM layer for generating contextualized representation 610 of each word in the input text from two directions. The model may consider all possible spans up to a maximum width, but only two text spans are depicted as example here. In one or more embodiments, low-scoring spans, e.g. with probability scores less than a predetermined threshold, are pruned, so that only a manageable number of spans 615 is considered for coreference decisions.

In embodiments, span information in equation (1) is concatenated to produce the final representation $g_i$ of span i:

$$g_i = [h_{START(i)}, h_{END(i)}, \hat{x}_i, \phi_i] \qquad (2)$$

where $\phi_i(\cdot)$ is a fixed length feature vector capturing other attributes in the text span's surface form or genre information.

Iterative span representation refinement: In embodiments, span representation may be further refined with coreference scores from previous model iteration. The process involves N iterations of refining span representations, denoted as $g_i^n$ for the representation of span i at iteration n. At iteration n, $g_i^n$ is computed with an self-attention mechanism that averages over previous representations $g_j^{n-1}$ weighted according to how likely each mention j is to be an antecedent for i, as defined below.

In embodiments, the baseline model may be used to initialize the span representation at $g_i$. The refined span representations allow the model to iteratively refine the antecedent distributions $P_n(y_i)$:

$$P_n(y_i) = \frac{e^{s(g_i^n, g_{y_i}^n)}}{\sum_{y \in Y(i)} e^{s(g_i^n, g_y^n)}} \quad (3)$$

In one or more embodiments, using $P_n(y_i)$ as attention weights, the attended span representation may be obtained as:

$$a_i^n = \sum_{y_i \in Y(i)} P_n(y_i) \cdot g_{y_i}^n \quad (4)$$

In one or more embodiments, the current span representation $g_i^n$ may then be updated via interpolation with its expected antecedent representation $a_i^n$:

$$f_i^n = \sigma(W_f[g_i^n, a_i^n]) \quad (5)$$

$$g_i^{n+1} = f_i^n \circ g_i^n + (1 - f_i^n) \circ a_i^n \quad (6)$$

wherein $f_i^n$ is a learned gate vector to determine for each dimension whether to keep the current span representation $g_i^n$ or to integrate new information from its expected antecedent representation $a_i^n$.

Coreference scoring: In one or more embodiments, given the state $S_t$ and current network parameters $\theta$, the probability of action $a_t$ choosing $y_t$ may be expressed as:

$$p_\theta(a_t = y_t | S_t) = \frac{\exp(s(t, y_t))}{\sum_{y' \in Y_t} \exp(s(t, y'))} \quad (7)$$

where s(i,j) is the pairwise coreference score 450 between span i and span j defined as following:

$$s(i,j) = s_m(i) + s_m(j) + S_c(i,j) + s_a(i,j) \quad (8)$$

In one or more embodiments, for the dummy antecedent, the score $s(i, \epsilon)$ is fixed to 0. Here $s_m(\cdot)$ is the mention score function, $s_c(\cdot, \cdot)$ is a bilinear score function used to prune antecedents, and $s_a(\cdot, \cdot)$ is the antecedent score function. Using $g_i$ to denote the refined representation for span i after gating, the functions $s_m(i)$ and $S_c(i,j)$ may be expressed as $S_m(i) = \theta_m^T FFNN_m(g_i)$, $S_c(i,j) = (g_i^T \Theta_c g_j)$, and $S_a(i,j)$ may be expressed as:

$$S_a(i,j) = \theta_a^T FFNN_a([g_i, g_j, g_i \circ g_j, \phi(i,j)]) \quad (9)$$

where FFNN denotes a feed-forward neural network and $\circ$ denotes the element-wise product. $\theta_m$, $\Theta_c$ and $\theta_a$ are network parameters. $\phi(i,j)$ is the feature vector encoding speaker and genre information from metadata.

The Reinforced Algorithm: In one or more embodiments, a policy gradient algorithm is explored to maximize an expected reward:

$$J(\theta) = \mathbb{E}_{a_{1:T} \sim p\theta(a)} R(a_{1:T}) \quad (10)$$

Computing an exact gradient of $J(\theta)$ may be infeasible due to the expectation over all possible action sequences. Instead, Monte-Carlo methods are used in one or more embodiments to approximate the actual gradient by randomly sampling $N_s$ trajectories according to $p_\theta$ and to compute gradients only over the sampled trajectories. In one or more embodiments, a baseline value is subtracted from the reward to reduce the variance of gradient estimation. In one or more embodiments, the gradient estimate may be expressed as follows:

$$\nabla_\theta J(\theta) \approx \frac{1}{N_s} \sum_{i=1}^{N_s} \sum_{t=1}^{T} \nabla_\theta \log p_\theta(a_{it}|S_{it})(R_{\tau_i} - b) \quad (11)$$

where $N_s$ is the number of sampled trajectories, $\tau_i = \{a_{i1}, \ldots, a_{iT}\}$ is the i-th sampled trajectory and $b = \sum_{i=1}^{N_s} R(\tau_i)/N_s$ is the baseline reward.

The Entropy Regularization: In one or more embodiments, to prevent the presented model from being stuck in highly-peaked polices towards a few actions, an entropy regularization term is added to encourage exploration. The final regularized policy gradient may be estimated as follows:

$$\nabla_\theta J(\theta) \approx \frac{1}{N_s} \sum_{i=1}^{N_s} \sum_{t=1}^{T} \nabla_\theta [\log p_\theta(a_{it}|S_{it}) + \lambda_{expr} p_\theta(a_{it}|S_{it}) \log p_\theta(a_{it}|S_{it})](R_{\tau_i} - b) \quad (12)$$

where $\lambda_{expr} \geq 0$ is the regularization parameter that controls how diverse the presented model may explore. The larger the $\lambda_{expr}$ is, the more diverse the presented model may explore. If $\lambda_{expr} \to \infty$, all actions may be sampled uniformly regardless of current policies. To the contrary, if $\lambda_{expr} = 0$, all actions may be sampled based on current polices.

Pretraining: In one or more embodiments, the policy network parameterized by 0, which contains all the parameters in the policy network, may be pretrained using the loss function below:

$$L(\theta) = -\sum_{i=1}^{N} \sum_{j \in Y_i} I(i, j) \log(p(j|i; \theta)) \quad (13)$$

where N is the number of mentions, I(i,j)=1 if mention i and j are coreferred, and 0 otherwise. $Y_i$ is the set of candidate antecedents of mention i.

Reward function: In one or more embodiments, once predicted coreference clusters and ground-truth clusters are obtained, an average of three metrics MUC, $B^3$, and CEAF$\phi_4$ is computed and used as the reward.

D. Some Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

Embodiments of the presented model were evaluated on one or more datasets using multiple training documents, development documents, and test documents. In one or more experimental settings, hyperparameters and evaluation metrics from Lee 2018 were reused with a few exceptions. First, embodiments of the presented model were pretrained using Equation (13) for around 200K steps and the learned parameters was used for initialization. Besides, the number of sampled trajectories was set $N_s=100$, the regularization parameter $\lambda_{expr}$ was tuned in $\{10^{-5}, 10^{-4}, 0.001, 0.01, 0.1, 1\}$ and was set to $10^{-4}$ based on the development set.

In one or more experimental settings, three standard metrics were used: MUC, $B^3$ and CEAF$\phi_4$. For each metric, the precision, recall, and F1 score were reported. The final evaluation was the average F1 of the above three metrics.

1. Some Results

In Table 1, embodiments of the presented model are compared to the coreference systems that have produced significant improvement over the last 3 years. The reported results are either adopted from their papers or reproduced from their code. The first section of the table lists the pipeline models, while the second section lists the end-to-end approaches. The third section lists the results of embodiments of the presented model with different variants.

It shall be noted that Luan et al.'s method contains 3 tasks: named entity recognition, relation inference and coreference resolution. In one or more embodiments, the relation inference task is disabled and the other two tasks are trained.

Built on top of the model in Lee 2018 but excluding ELMo, the base reinforced model embodiment improves the average F1 score around 2 points (statistical significant t-test with $p<0.05$) compared with Lee 2017 and Zhang et al. It is even comparable with the end-to-end multi-task coreference model that has ELMo support (Luan et al.), which demonstrates the power of reinforcement learning combined with a state-of-the-art end-to-end model. Regarding embodiments of the present model, it is shown that using entropy regularization to encourage exploration may improve the result by 1 point. Moreover, introducing the context-dependent ELMo embedding to the base model embodiment may further boost the performance, which is consistent with the results in Lee 2018. It is also noticed that improvement of full model embodiments is mainly from higher precision scores and reasonably good recall scores, which indicates that the reinforced model embodiment combined with more active exploration produces better coreference scores to reduce false positive coreference links.

Overall, embodiments of the full model achieve the state-of-the-art performance of 73.8% F1-score when using ELMo and entropy regularization (compared to models marked with * in Table 1), and the approach embodiments simultaneously obtain the best F1-score of 70.5% when using fixed word embedding only.

TABLE 1

Experimental results with MUC, $B^3$ and CEA$\phi_4$ metrics on one or more test sets. The models marked with * utilized word embedding from deep language model ELMo (Embeddings from Language Models, Peters et al., Deep contextualized word representations. In *Proceedings of the 2018 Conference of the North American Chapter of the Association for Computational Linguistics: Human Language Technologies (NAACL-HLT)*, pages 2227-2237, New Orleans, LA). The F1 improvement is statistically significant under t-test with $p < 0.05$, compared with Lee 2018.

| Model | MUC | | | $B^3$ | | | CEAF$\phi_4$ | | | |
|---|---|---|---|---|---|---|---|---|---|---|
| | Prec. | Rec. | F1 | Prec. | Rec. | F1 | Prec. | Rec. | F1 | Ave. F1 |
| Wiseman et al.[1] | 77.5 | 69.8 | 73.4 | 66.8 | 57.0 | 61.5 | 62.1 | 53.9 | 57.7 | 64.2 |
| Clark and Manning[2] | 79.2 | 70.4 | 74.6 | 69.9 | 58.0 | 63.4 | 63.5 | 55.5 | 59.2 | 65.7 |
| Clark and Manning[3] | 79.9 | 69.3 | 74.2 | 71.0 | 56.5 | 63.0 | 63.8 | 54.3 | 58.7 | 65.3 |
| Lee 2017 | 78.4 | 73.4 | 75.8 | 68.6 | 61.8 | 65.0 | 62.7 | 59.0 | 60.8 | 67.2 |
| Zhang et al.[4] | 79.4 | 73.8 | 76.5 | 69.0 | 62.3 | 65.5 | 64.9 | 58.3 | 61.4 | 67.8 |
| Luan et al.*[5] | 78.6 | 77.1 | 77.9 | 66.3 | 65.4 | 65.9 | 66.0 | 63.1 | 64.5 | 69.4 |
| Lee 2018* | 81.4 | 79.5 | 80.4 | 72.2 | 69.5 | 70.8 | 68.2 | 67.1 | 67.6 | 73.0 |
| Base Reinforced Model | 79.0 | 76.9 | 77.9 | 66.8 | 64.9 | 65.8 | 66.5 | 63.0 | 64.7 | 69.5 |
| + Entropy Regularization | 79.6 | 77.2 | 78.4 | 70.7 | 65.1 | 67.8 | 67.6 | 63.4 | 65.4 | 70.5 |
| + ELMO embedding* | 85.4 | 77.9 | 81.4 | 77.9 | 66.4 | 71.7 | 70.6 | 66.3 | 68.4 | 73.8 |

[1] Wiseman et al., 2016. Learning global features for coreference resolution. In *Proceedings of the 2016 Conference of the North American Chapter of the Association for Computational Linguistics: Human Language Technologies (NAACL-HLT)*, pages 994-1004, San Diego, CA.

[2] Kevin Clark and Christopher D Manning, 2016a. Deep reinforcement learning for mention-ranking coreference models. In *Proceedings of the 2016 Conference on Empirical Methods in Natural Language Processing (EMNLP)*, pages 2256-2262, Austin, TX

[3] Kevin Clark and Christopher D Manning, 2016b. Improving coreference resolution by learning entity-level distributed representations. In *Proceedings of the 54th Annual Meeting of the Association for Computational Linguistics (ACL)*, pages 643-653, Berlin, Germany

[4] Rui Zhang et al., Neural coreference resolution with deep biaffine attention by joint mention detection and mention clustering. In *Proceedings of the 56th Annual Meeting of the Association for Computational Linguistics (ACL)*, pages 102-107, Melbourne, Australia

[5] Yi Luan et al., Multi-task identification of entities, relations, and coreference for scientific knowledge graph construction. In *Proceedings of the 2018 Conference on Empirical Methods in Natural Language Processing (EMNLP)*, pages 3219-3232, Brussels, Belgium.

TABLE 2

The overall mention detection results on test sets. The F1 improvement is statistically significant under t-test with $p < 0.05$.

| Model | Prec. | Rec. | F1 |
|---|---|---|---|
| Full model Embodiment | 89.6 | 82.2 | 85.7 |
| Lee 2018 | 86.2 | 83.7 | 84.9 |

Since mention detection is a subtask of coreference resolution, the performance of mention detection was also studies in one or more experiments. Table 2 shows the mention detection results on test sets. Similar to coreference linking results, the full model embodiment achieved higher precision and F1 score, which indicates that the full model embodiment may significantly reduce false positive mentions while it may still find a reasonable number of mentions.

2. Some Analysis and Discussion

Ablation Study: In one or more experimental settings, to understand the effect of different components, an ablation study was conducted with results shown in Table 3. Clearly, removing entropy regularization deteriorated the average F1 score by 1%. Also, disabling coarse-to-fine pruning or second-order inference decreased 0.3/0.5 F1 score. Among all the components, ELMo embedding made the most contribution and improves the result by 3.1%.

TABLE 3

Ablation study on the development set. "Coarse-to-fine pruning" and "second-order inference" were adopted from Lee 2018.

| Model | Avg. F1 |
|---|---|
| Full Model Embodiment | 74.1 |
| w/o entropy regularization | 73.1 |
| w/o coarse-to-fine pruning | 73.8 |
| w/o second-order inference | 73.6 |
| w/o ELMo embedding | 71.0 |

Figure 7:
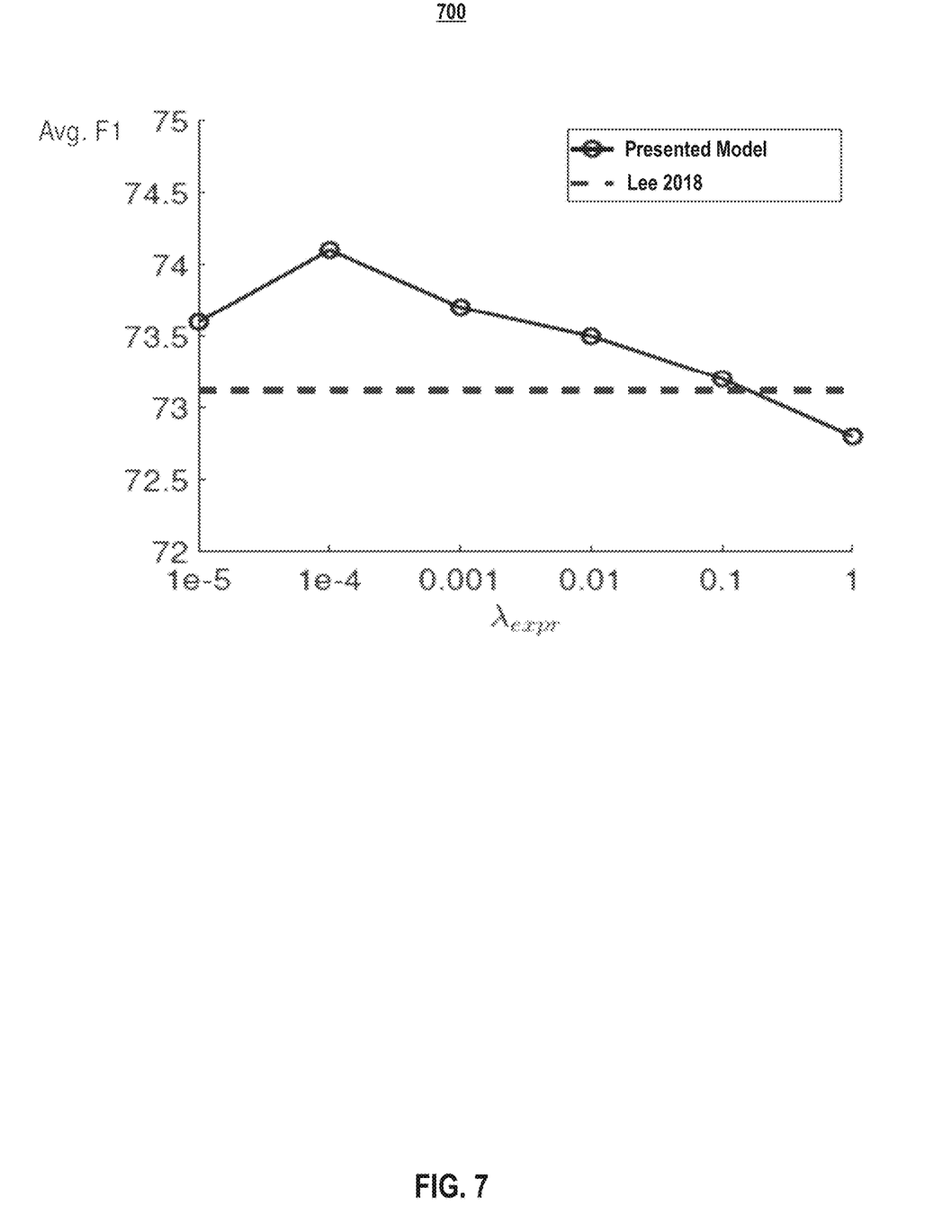
FIG. 7 depicts average F1 score on the development set with different regularization parameter, according to embodiments of the present disclosure.

Impact of the parameter $\lambda_{expr}$: Since the parameter $\lambda_{expr}$ directly controls how diverse the model is explored during training, it is necessary to study its effect on the model performance. FIG. 7 shows the avg. F1 score on the development set for full model embodiments and Lee 2018. The result of Lee 2018 was also plotted for comparison, which is a flat line since it does not depend on $\lambda_{expr}$. It was observed that $\lambda_{expr}$ did have a strong effect on the performance and the best value is around $10^{-4}$. Besides, the full model embodiments consistently outperformed Lee 2018 over a wide range of $\lambda_{expr}$.

E. Some Conclusions

Disclosed herein are embodiments of an end-to-end reinforcement learning based coreference resolution model. Embodiments of the model transform the supervised higher order coreference model to a policy gradient model that may directly optimize coreference evaluation metrics. Experiments various benchmark demonstrate that the presented model integrated with entropy regularization significantly outperforms previous coreference systems.

In embodiments, the performance of the present model embodiments may be improved by incorporating mention detection result as a part of the reward, or introducing intermediate step rewards for each action to better guide the behavior of an reinforcement learning (RL) model.

F. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 8:
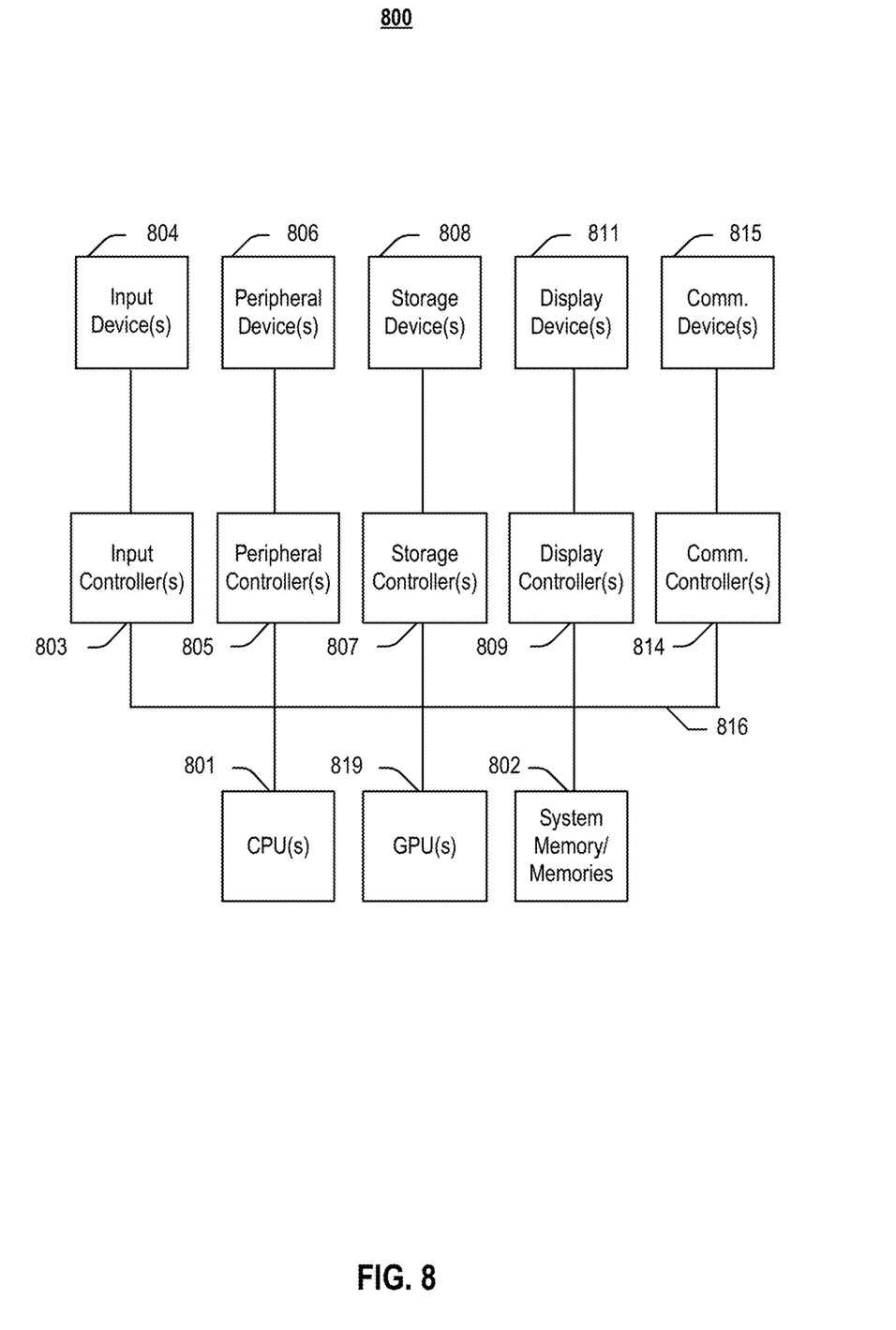
FIG. 8 depicts a simplified block diagram of a computing device/information handling system, in accordance with embodiments of the present document.

FIG. 8 depicts a simplified block diagram of a computing device/information handling system (or computing system) according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more central processing units (CPU) 801 that provides computing resources and controls the computer. CPU 801 may be implemented with a microprocessor or the like, and may also include one or more graphics processing units (GPU) 819 and/or a floating-point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, touchscreen, and/or stylus. The computing system 800 may also include a storage controller 807 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present invention. Storage device(s) 808 may also be used to store processed data or data to be processed in accordance with the invention. The system 800 may also include a display controller 809 for providing an interface to a display device 811, which may be a cathode ray tube (CRT), a thin film transistor (TFT) display, organic light-emitting diode, electroluminescent panel, plasma panel, or other type of display. The computing system 800 may also include one or more peripheral controllers or interfaces 805 for one or more peripherals 806.

Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training a coreference resolution model comprising:
   [a] inputting a document comprising a set of text into a policy network to identify mentions in the document;
   [b] given a current identified mention in the document, using the policy network to obtain a probability distribution of a set of actions in which the set of actions comprise linking the current identified mention with a prior identified mention or not linking the current identified mention to any prior identified mention;
   [c] selecting an action from the set of actions using the probability distribution of actions;
   [d] based upon the selected action, updating a coreference graph for the document, in which the coreference graph comprises mentions as nodes and links representing coreference connections between mentions;
   [e] responsive to the document having another mention, selecting it as the current identified mention and returning to step [b];
   [f] responsive to the document not having another mention, outputting the coreference graph for the document;
   [g] using the outputted coreference graph and ground truth coreference information for the document, computing a reward based upon one or more metrics;
   [h] using a trajectory of selected actions and the reward to compute a gradient; and
   [i] updating the policy network using the gradient.

2. The computer-implemented method of claim 1 wherein the policy network is pre-trained using training steps comprising:
   inputting a set of documents into the policy network that identifies mentions in the documents and generates a coreference graph for each document;
   using corresponding ground-truth coreference graphs for the document to compute a loss relative to the generated coreference graphs obtained from the policy network;
   using the loss to update the policy network; and iterating the above training steps until a stopping condition is reached, the step condition comprises one or more criteria from number of epochs, error level, or number of iterations.

3. The computer-implemented method of claim 1 further comprising:

repeating the steps of [a]-[f] for the document to obtain a set of coreference graphs and a corresponding set of trajectories of actions for each document in an iterative operation;

obtaining a sample set of coreference graphs from the set of coreference graphs;

computing a reward for each coreference graph from the sample set of coreference graphs; and using the rewards and trajectories of actions in the sample set to compute a gradient.

4. The computer-implemented method of claim 1 wherein inputting a document comprising a set of text into a policy network to identify mentions in the document comprises:

generating, using a character and word embeddings encoder, a plurality of embeddings with each embedding as a concatenation of fixed pretrained word embeddings and convolutional neural network (CNN) character embeddings;

computing and concatenating, using a bidirectional Long short-term memory (LSTM) layer, contextualized representation of each word in the input document from two directions;

performing iterative operations comprising:

generating, with head-finding attention, span representation from the concatenated contextualized representations of each word;

obtaining a mention score using a mention feed-forward neural network with a self-attention mechanism based on the generated span representation;

obtaining an antecedent score using an antecedent feed-forward neural network with the self-attention mechanism based on the generated span representation; and obtaining a coreference score based on at least the obtained mention score and the generated antecedent score; and computing, using a masked softmax layer, a probability distribution for each mention based at least on the coreference score.

5. The computer-implemented method of claim 4 wherein the probability distribution is only over candidate antecedents for each mention, with probability distribution for mentions after the current mention in the document masked by the masked softmax layer.

6. The computer-implemented method of claim 4 wherein the self-attention mechanism averages over a previous iteration's representations weighted by a normalized coreference scores.

7. The computer-implemented method of claim 4 wherein the generated span representations with probability scores less than a predetermined threshold are pruned from coreference decisions.

8. A system for training a coreference resolution model, comprising at least one processor, and a memory storing instructions, wherein the instructions when executed by the at least one processor, cause the at least one processor to perform the computer-implemented method of claim 1.

9. A computer-implemented method for coreference resolution using a coreference resolution model comprising:

receiving a document comprising a set of words;

generating, using a character and word embeddings encoder, a plurality of embeddings with each embedding as a concatenation of fixed word embeddings and convolutional neural network (CNN) character embeddings;

computing and concatenating, using a bidirectional Long short-term memory (LSTM) layer, contextualized representation of each word in the document from two directions;

performing iterative operations comprising:

generating, with head-finding attention, span representation from the concatenated contextualized representations for a current mention;

obtaining a mention score using a mention feed-forward neural network with a self-attention mechanism based on the generated span representation;

obtaining an antecedent score using an antecedent feed-forward neural network with the self-attention mechanism based on the generated span representation; and obtaining a coreference score for the current mention based on at least the obtained mention score and the obtained antecedent score;

computing, using a masked softmax layer, probability distribution over a set of actions in which the set of actions comprise linking the current identified mention with a prior identified mention or not linking the current identified mention to any prior identified mention for the current mention based at least on the coreference score;

selecting an action from the set of actions using the probability distribution of actions; and based upon the selected action, updating a coreference graph for the document, in which the coreference graph comprises mentions as nodes and links representing coreference connections between mentions.

10. The computer-implemented method of claim 9 wherein the coreference resolution model is pretrained using steps comprising:

inputting a training document into the coreference resolution model to generate a set of coreference graphs and a corresponding set of trajectories of actions for each document in an iterative operation;

obtaining a sample set of coreference graphs from the set of coreference graphs;

computing a reward for each coreference graph from the sample set of coreference graphs;

using the rewards and trajectories of actions in the sample set to compute a gradient; and using the gradient to update parameters of the coreference resolution model.

11. The computer-implemented method of claim 10 wherein the gradient further comprising an entropy regularization parameter to control exploration of the set of trajectories of actions.

12. The computer-implemented method of claim 11 wherein the set of trajectories of actions are sampled based on a current policy when the entropy regularization parameter is set as 0.

13. The computer-implemented method of claim 11 wherein the set of trajectories of actions are sampled uniformly regardless of a current policy when the entropy regularization parameter is set as $\infty$.

14. The computer-implemented method of claim 10 wherein the probability distribution is only over candidate antecedents for each mention, with probability distribution for mentions after the current mention in the document masked by the masked softmax layer.

15. The computer-implemented method of claim 10 wherein the self-attention mechanism averages over a previous iteration's representations weighted by a normalized coreference scores.

16. A non-transitory computer-readable medium or media comprising one or more sequences of instructions which, when executed by one or more processors, causes the steps for training a coreference resolution model to be performed comprising:
   [a] inputting a document comprising a set of text into a policy network to identify mentions in the document;
   [b] given a current identified mention in the document, using the policy network to obtain a probability distribution of a set of actions in which the set of actions comprise linking the current identified mention with a prior identified mention or not linking the current identified mention to any prior identified mention;
   [c] selecting an action from the set of actions using the probability distribution of actions;
   [d] based upon the selected action, updating a coreference graph for the document, in which the coreference graph comprises mentions as nodes and links representing coreference connections between mentions;
   [e] responsive to the document having another mention, selecting it as the current identified mention and returning to step [b];
   [f] responsive to the document not having another mention, outputting the coreference graph for the document;
   [g] using the outputted coreference graph and a ground truth coreference information for the document, computing a reward based upon one or more metrics;
   [h] using a trajectory of selected actions and the reward to compute a gradient; and
   [i] updating the policy network using the gradient.

17. The non-transitory computer-readable medium or media of claim 16 the policy network is pre-trained using training steps comprising:
   inputting a set of documents into the policy network that identifies mentions in the documents and generates a coreference graph for each document;
   using corresponding ground-truth coreference graphs for the document to compute a loss relative to the generated coreference graphs obtained from the policy network;
   using the loss to update the policy network; and
   iterating the above training steps until a stopping condition is reached, the step condition comprises one or more criteria from number of epochs, error level, or number of iterations.

18. The non-transitory computer-readable medium or media of claim 17 further comprising:
   repeating the steps of [a]-[f] for the document to obtain a set of coreference graphs and a corresponding set of trajectories of actions for each document in an iterative operation;
   obtaining a sample set of coreference graphs from the set of coreference graphs;
   computing a reward for each coreference graph from the sample set of coreference graphs; and
   using the rewards and trajectories of actions in the sample set to compute a gradient.

19. The non-transitory computer-readable medium or media of claim 16 wherein step [a] further comprises:
   generating, using a character and word embeddings encoder, a plurality of embeddings with each embedding as a concatenation of fixed pretrained word embeddings and convolutional neural network (CNN) character embeddings;
   computing and concatenating, using a bidirectional Long short-term memory (LSTM) layer, contextualized representation of each word in the input document from two directions;
   performing iterative operations comprising:
      generating, with head-finding attention, span representation from the concatenated contextualized representations of each word;
      obtaining a mention score using a mention feed-forward neural network with a self-attention mechanism based on the generated span representation;
      obtaining an antecedent score using an antecedent feed-forward neural network with the self-attention mechanism based on the generated span representation; and
      obtaining a coreference score based on at least the obtained mention score and the obtained antecedent score; and
   computing, using a masked softmax layer, a probability distribution for each mention based at least on the coreference score.

20. The non-transitory computer-readable medium or media of claim 19 wherein the probability distribution is only over candidate antecedents for each mention, with probability distribution for mentions after the current mention in the document masked by the masked softmax layer.

21. The non-transitory computer-readable medium or media of claim 19 wherein the self-attention mechanism averages over a previous iteration's representations weighted by a normalized coreference scores.

* * * * *